(12) United States Patent
Beers et al.

(10) Patent No.: US 10,161,416 B2
(45) Date of Patent: Dec. 25, 2018

(54) ROTARY MACHINE HEAT SINK

(71) Applicant: Hamilton Sundstrand Corporation, Windsor Locks, CT (US)

(72) Inventors: Craig M. Beers, Wethersfield, CT (US); Christopher McAuliffe, Windsor, CT (US); Murtuza Lokhandwalla, South Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 371 days.

(21) Appl. No.: 14/293,461

(22) Filed: Jun. 2, 2014

(65) Prior Publication Data
US 2015/0345510 A1 Dec. 3, 2015

(51) Int. Cl.
*F04D 25/08* (2006.01)
*F04D 29/58* (2006.01)
(Continued)

(52) U.S. Cl.
CPC ....... *F04D 29/5853* (2013.01); *F01D 25/125* (2013.01); *F01D 25/168* (2013.01); *F04D 25/08* (2013.01); *B64D 13/06* (2013.01); *F05D 2240/52* (2013.01); *F05D 2260/221* (2013.01); *Y02T 50/676* (2013.01)

(58) Field of Classification Search
CPC ...... F04D 29/5853; F04D 25/08; F04D 29/58; F01D 25/08; F01D 25/125; F01D 25/168; F01D 5/08; F01D 25/12; F01D 25/162; B64D 13/06; F05D 2240/50; F05D 2240/52; F05D 2260/221; F05D 2260/22141; Y02T 50/676; H02K 1/32
See application file for complete search history.

(56) References Cited

U.S. PATENT DOCUMENTS 4,896,975 A * 1/1990 Bescoby ............... F01D 25/125
384/114
5,102,305 A * 4/1992 Bescoby ................... F01D 5/02
416/241 B
(Continued)

FOREIGN PATENT DOCUMENTS

EP 2258948 A2 12/2010
EP 2572989 A1 3/2013
(Continued)

OTHER PUBLICATIONS

Extended European Search Report for European Patent Application No. 15170134.9, dated Oct. 5, 2015, 6 pages.
(Continued)

*Primary Examiner* — Jason Shanske
*Assistant Examiner* — Jesse Prager
(74) *Attorney, Agent, or Firm* — Kinney & Lange, P.A.

(57) ABSTRACT

A heat sink that can be positioned around a rotating shaft includes a cylindrical body with a first end and a second end, a bore running through the body with a first opening at the first end of the body and a second opening at the second end of the body, fins extending radially outward from the body and running from the first end to the second end of the body, and channels defined between the fins and running from the first end to the second end of the body.

13 Claims, 4 Drawing Sheets

(51) Int. Cl.
    *F01D 25/12*     (2006.01)
    *F01D 25/16*     (2006.01)
    *B64D 13/06*     (2006.01)

(56) References Cited

U.S. PATENT DOCUMENTS

| | | | |
|---|---|---|---|
| 6,661,133 B2 * | 12/2003 | Liebermann | H02K 9/22 |
| | | | 310/58 |
| 8,496,533 B2 | 7/2013 | Beers et al. | |
| 8,517,665 B2 | 8/2013 | Lugo et al. | |
| 8,734,017 B1 | 5/2014 | Colson et al. | |
| 10,033,250 B2 * | 7/2018 | Tremelling | H02K 9/19 |
| 2011/0229351 A1 * | 9/2011 | Beers | B64D 13/06 |
| | | | 417/372 |
| 2012/0248908 A1 | 10/2012 | Zahora et al. | |

FOREIGN PATENT DOCUMENTS

| | | | | |
|---|---|---|---|---|
| EP | 2605380 A2 * | 6/2013 | | H02K 1/32 |
| FR | 1138646 A | 6/1957 | | |
| WO | WO0237046 A2 | 5/2002 | | |

OTHER PUBLICATIONS

Extended European Search Report for European Patent Application No. 17186511.6, dated Oct. 24, 2017, 7 pages.

* cited by examiner

ROTARY MACHINE HEAT SINK

BACKGROUND

The present invention relates to rotary machines, and in particular, to a heat sink for a bearing in an air cycle machine.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin.

To condition the air as needed, air cycle machines include a fan section, a compressor section, and a turbine section that are all mounted on a common shaft. The compressor receives partially compressed air from the aircraft and further compresses the air. The compressed air then moves through a heat exchanger and is cooled by the fan section. The air then moves through the turbine section where it is expanded for use in the aircraft, for example, for use as cabin air. The turbine section also extracts energy from the air and uses the energy to drive the fan section and the compressor section via the common shaft.

Air cycle machines also include bearings that are positioned around the common shaft. The bearings are cooled by passing a cooling air flow through a cavity that is adjacent the bearing. The cooling air flow then exits the cavity and is discharged from the air cycle machine into an ambient. The cooling air flow is limited in that it can only cool the bearing using convective heat transfer. The cooling air flow is further limited in that the cooling air flow in the cavity flows through a center of the cavity, meaning a majority of the cooling air flow does not flow across a surface of the bearing.

SUMMARY

A heat sink that can be positioned around a rotating shaft includes a cylindrical body with a first end and a second end. A bore runs through the body with a first opening at the first end of the body and a second opening at the second end of the body. Fins extend radially outward from the body and run from the first end to the second end of the body. Channels are defined between the fins and run from the first end to the second end of the body.

A rotary machine includes a shaft extending through the rotary machine and a bearing positioned around the shaft. A heat sink is mounted on the shaft between the bearing and the shaft. The heat sink has a cylindrical body with fins extending radially outward from the body and running from a first end to a second end of the body.

DETAILED DESCRIPTION

In general, the present disclosure is a heat sink for use in a rotary machine. The heat sink can be mounted on a shaft between a bearing and the shaft to dissipate heat away from the bearing and out of the rotary machine. The heat sink includes a body with a bore running through the body from a first end to a second end. A shaft can be positioned in the bore. A plurality of fins extend radially outward from the body and run from the first end to the second end of the body. Each of the plurality of fins includes a contact surface that can be positioned against an inner surface of the bearing to conductively transfer heat away from the bearing. A plurality of channels are defined between the plurality of fins and run from the first end to the second end of the body. Cooling air flow can flow through the plurality of channels and across the inner surface of the bearing to convectively transfer heat away from the bearing. Allowing for both conductive and convective heat transfer make the heat sink an efficient and effective way to transfer heat away from the bearing and out of the rotary machine.

Figure 1:
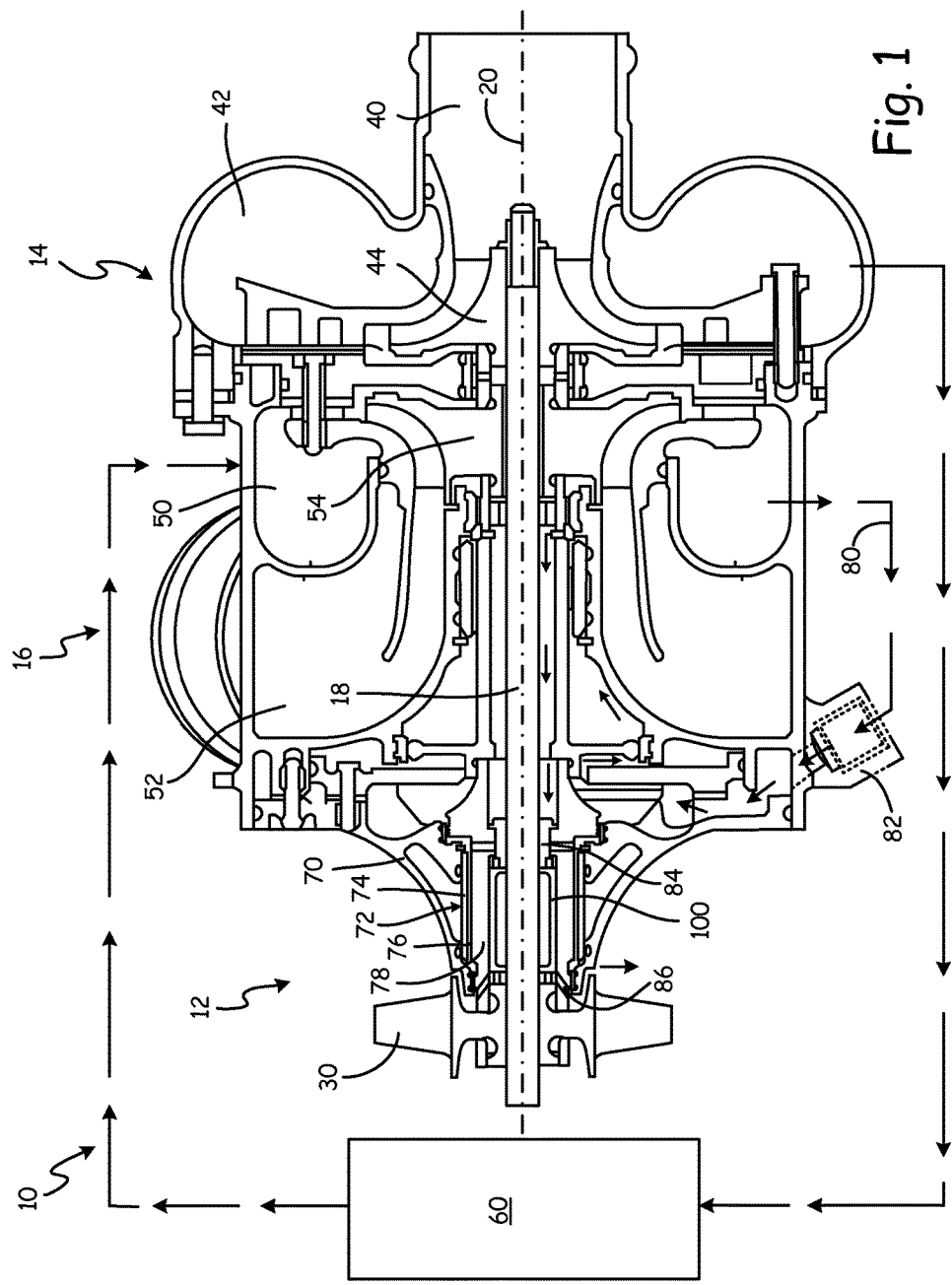
FIG. 1 is a cross-sectional view of an air cycle machine.

FIG. 1 is a cross-sectional view of air cycle machine 10. Air cycle machine 10 includes fan section 12, compressor section 14, and turbine section 16 that are all mounted on shaft 18. Shaft 18 rotates around central axis 20. Fan section 12 includes fan blade 30. Compressor section 14 includes compressor inlet 40, compressor outlet 42, and compressor nozzle 44. Turbine section 16 includes turbine inlet 50, turbine outlet 52, and turbine nozzle 54. Also shown in FIG. 1 is heat exchanger 60, housing 70, bearing 72, bearing sleeve 74, bearing foil 76, bearing journal 78, cooling air flow 80, cooling air flow inlet 82, cavity 84, opening 86, and heat sink 100.

Shaft 18 is a rod, such as a titanium tie-rod, used to connect other components of air cycle machine 10. Central axis 20 is an axis with respect to which other components may be arranged.

Fan section 12 includes fan blade 30. Fan section 12 is mounted on shaft 18. Fan blades 30 rotate around shaft 18. Fan section 12 is typically used to draw in ram air from an associated gas turbine engine or other aircraft component. Fan section 12 may also be used to draw air through heat exchanger 60.

Compressor section 14 includes compressor inlet 40, compressor outlet 42, and compressor nozzle 44. Compressor section 14 is mounted on shaft 18. Compressor inlet 40 is a duct through which air is received to be compressed. Compressor outlet 42 is a duct through which air can be routed to other systems after it has been compressed in compressor section 14. Compressor nozzle 44 is a nozzle section that rotates through the air in compressor section 14. In particular, compressor nozzle 44 is a rotor or impeller.

Turbine section 16 includes turbine inlet 50, turbine outlet 52, and turbine nozzle 54. Turbine section 16 is mounted on shaft 18. Turbine inlet 50 is a duct through which air passes prior to expansion in turbine section 16. Turbine outlet 52 is a duct through which air can be routed after it has been expanded to be used in other areas on an aircraft. For example, air can be routed out of turbine outlet 52 and into a cabin for use as cabin air. Turbine nozzle 54 is a nozzle section that extracts energy from air passing through turbine section 16. In particular, turbine nozzle 54 is a rotor or impeller. Air passing through turbine section 16 drives the rotation of turbine section 16 and any attached components, including shaft 18, fan section 12, and compressor section 14.

Air is received in air cycle machine 10 at compressor inlet 40. The air can be ram air from a ram air scoop or the air can be pulled into air cycle 10 using fan section 12 from an associated gas turbine or other aircraft component. The air passes through compressor section 14 where it is compressed with compressor nozzle 44 and then discharged out of compressor outlet 42. From compressor outlet 42, the air can pass through heat exchanger 60. Fan section 12 may be used to draw air through heat exchanger 60. Air that exits heat exchanger 60 is then routed into turbine inlet 50. The air expands as it passes through turbine section 16 and it drives turbine nozzle 54 before it is discharged out of turbine outlet 52. Air that is discharged out of turbine outlet 52 can then be routed to other parts of the aircraft, for example, for use as cabin air.

Adjacent fan section 12 in air cycle machine 10 is housing 70. Housing 70 forms an outer portion of air cycle machine 10. Bearing 72 is positioned between shaft 18 and housing 70. Bearing 72 is a foil bearing in the embodiment shown in FIG. 1. Bearing 72 includes bearing sleeve 74, bearing foil 76, and bearing journal 78. Bearing foil 76 is positioned between bearing sleeve 74 and bearing journal 78. Bearing sleeve 74 forms an outer surface of bearing 72 and bearing journal 78 forms an inner surface of bearing 72. The inner surface of bearing journal 78 faces shaft 18. Heat sink 100 is mounted on shaft 18 between bearing 72 and shaft 18 to dissipate heat out of bearing 72.

Cooling air flow 80 is bled from the air being routed from heat exchanger 60 to turbine inlet 50. Cooling air flow 80 is routed through cooling air flow inlet 82 and through air cycle machine 10 to cavity 84. Cavity 84 is an open area surrounding shaft 18 that is defined by fan section 12 and turbine section 16. Heat sink 100 is positioned in cavity 84 adjacent fan blade 30. Cooling air flow 80 will flow through cavity 84 and will pass through heat sink 100 to cool bearing 72. Cooling air flow 80 will then exit through opening 86 that is formed between housing 70 and fan blade 30 and will be discharged into an ambient out of air cycle machine 10.

Figure 2A:
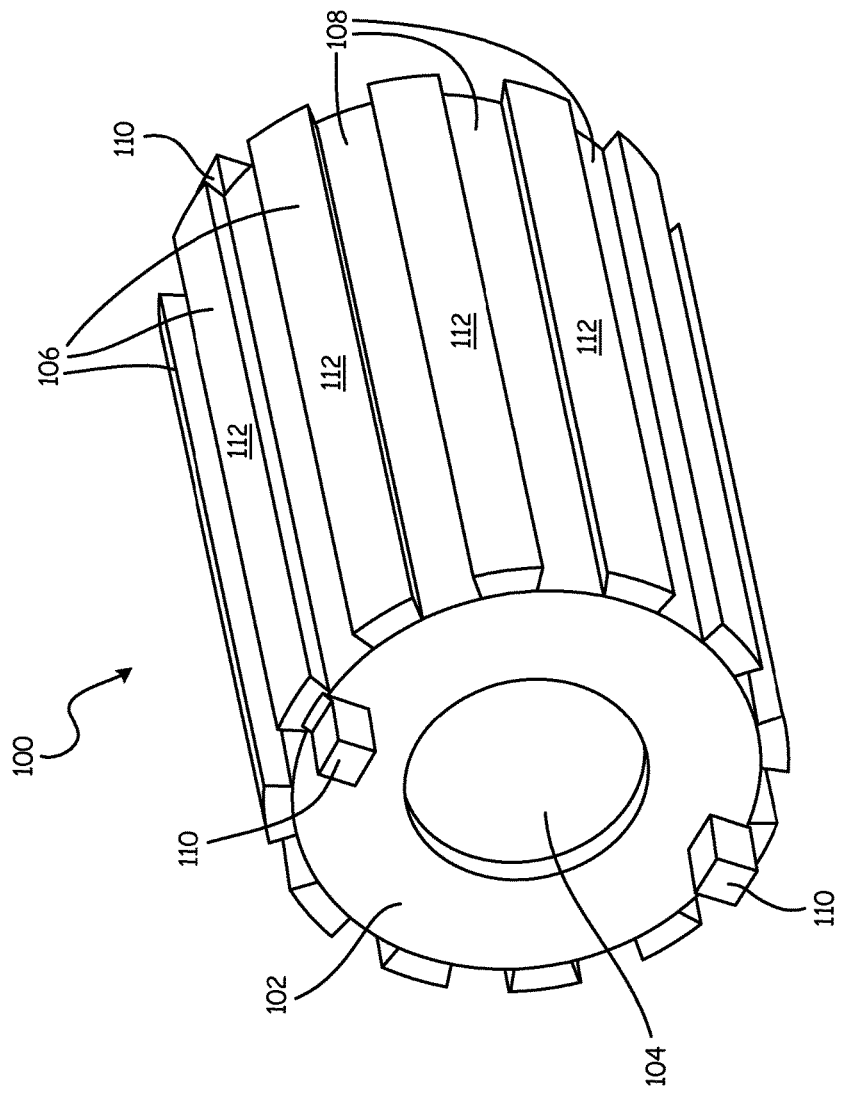
FIG. 2A is a perspective view of a heat sink.
Figure 2B:
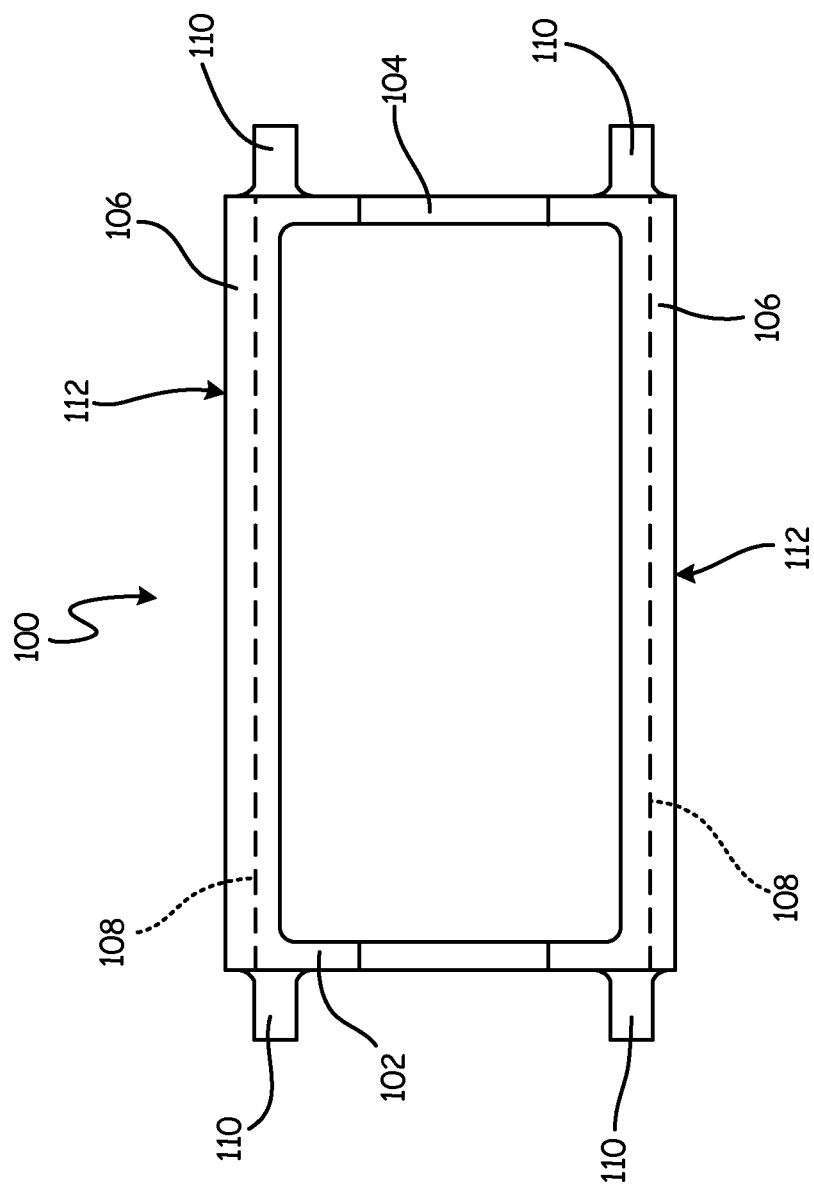
FIG. 2B is a cross-sectional side view of the heat sink seen in FIG. 2A.

FIG. 2A is a perspective view of heat sink 100. FIG. 2B is a cross-sectional side view of heat sink 100. Heat sink 100 includes body 102, bore 104, fins 106, channels 108, standoffs 110, and contact surfaces 112.

Heat sink 100 includes cylindrical body 102. Heat sink 100 is made out of a metallic material. Bore 104 extends axially through body 102 with a first opening at a first end of body 102 and a second opening at a second end of body 102. Bore 104 runs through heat sink 100 so that a shaft or other part can be positioned in bore 104 of heat sink 100.

Fins 106 extend radially outward from body 102 and run from the first end to the second end of body 102. Fins 106 each have contact surface 112 on a radially outer surface of fins 106. Contact surfaces 112 can come into contact with a hot part to dissipate heat out of the hot part and into fins 106. Channels 108 are defined in between fins 106 and run from the first end to the second end of body 102. Channels 108 are open spaces in between fins 106 through which air can flow.

Standoffs 110 are protrusions that are positioned on a first end and a second end of body 102 of heat sink 100. In the embodiment shown in FIG. 2A, there are two standoffs 110 positioned on each end of heat sink 100. In alternate embodiments, any number of standoffs 110 can be positioned on the first end and the second end of body 102 of heat sink 100. Standoffs 110 are positioned on heat sink 100 to limit axial movement of heat sink 100 with respect to shaft 18. If heat sink 100 were to slide axially forward or aft, standoffs 110 would come into contact with adjacent components and limit the axial movement of heat sink 100.

Heat sink 100 can be used in any rotary machine that has a shaft and a bearing positioned around the shaft. This can include air cycle machines and other turbine and motor driven compressors and fans. Heat sink 100 is advantageous, as heat can be transferred conductively and convectively through heat sink 100. Heat is transferred conductively when contact surfaces 112 of fins 106 come into contact with a hot part and absorb heat from the hot part into heat sink 100. Heat is transferred convectively as cooling air flow in channels 108 flows across a surface of a hot part and absorbs heat from the hot part into the cooling air flow.

Figure 3:
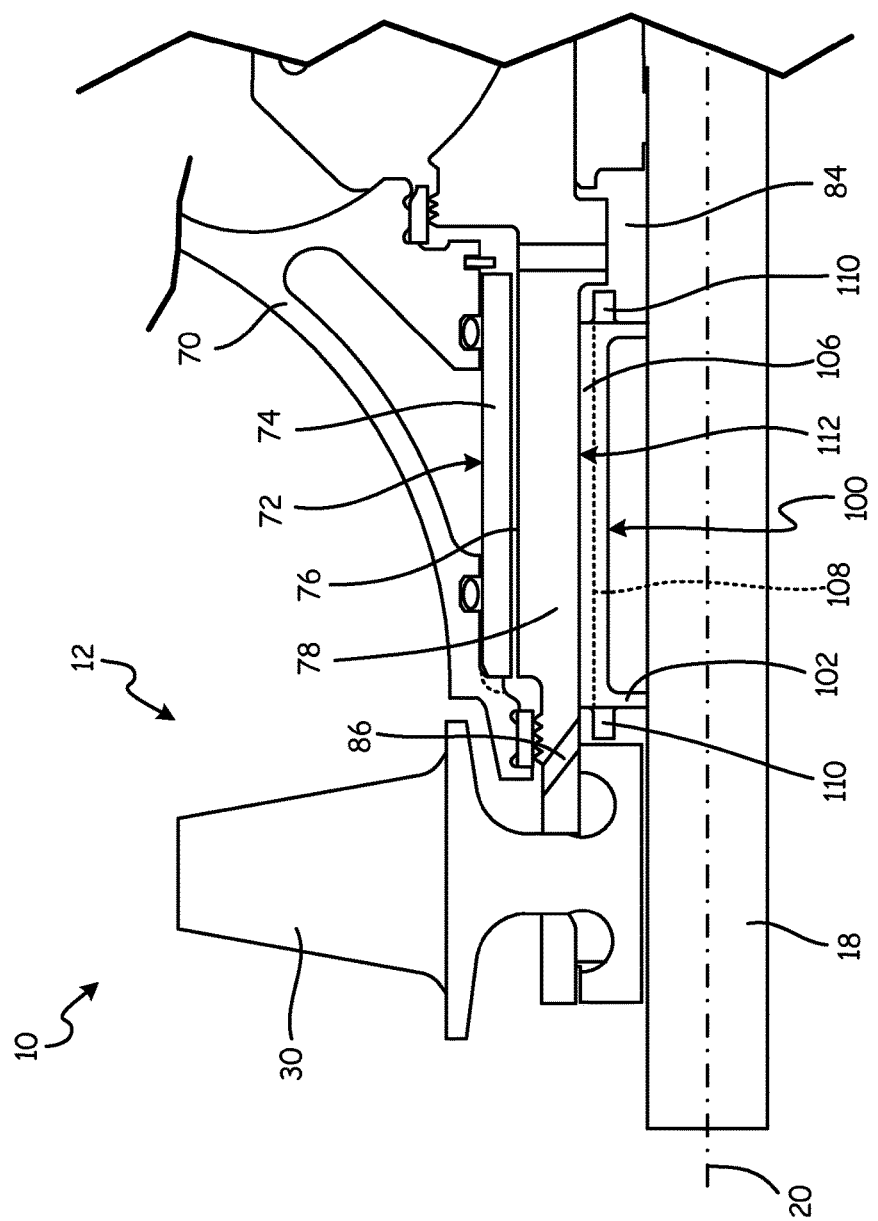
FIG. 3 is an enlarged cross-sectional view of the heat sink in a fan section of the air cycle machine.

FIG. 3 is an enlarged cross-sectional view of heat sink 100 in fan section 12 of air cycle machine 10. The portion of air cycle machine 10 shown in FIG. 3 includes fan section 12 (including fan blade 30), shaft 18, housing 70, bearing 72, bearing sleeve 74, bearing foil 76, bearing journal 78, cavity 84, opening 86, and heat sink 100. Heat sink 100 further includes body 102, fins 106, channels 108, standoffs 110, and contact surfaces 112.

Air cycle machine 10 includes fan section 12 that is mounted on shaft 18. Shaft 18 is a common shaft that runs through air cycle machine 10 and that rotates around central axis 20. Fan section 12 includes fan blade 30 that rotates with shaft 18 around central axis 20. Adjacent fan blade 30 is housing 70. Housing 70 forms an outer portion of air cycle machine 10.

Positioned between shaft 18 and housing 70 is bearing 72. Bearing 72 is a foil bearing that includes bearing sleeve 74, bearing foil 76, and bearing journal 78. Bearing foil 76 is positioned between bearing sleeve 74 and bearing journal 78. Bearing sleeve 74 forms an outer surface of bearing 72 and bearing journal 78 forms an inner surface of bearing 72. The inner surface of bearing journal 78 faces shaft 18. Cavity 84 is formed between shaft 18 and the inner surface of bearing journal 78. Cooling air flow can be routed through cavity 84 to cool bearing 72. The cooling air flow can then exit through opening 86. Opening 86 is an opening through bearing journal 78 between fan blade 30 and housing 70. After cooling air flows through opening 86 it can be discharged from air cycle machine 10 into an ambient.

Positioned in cavity 84 around shaft 18 is heat sink 100. Heat sink 100 is mounted on shaft 18 so that it rotates with shaft 18 around central axis 20. Heat sink 100 includes body 102 with fins 106 extending radially outward from body 102. Each of fins 106 includes contact surface 112 on a radially outer surface that comes into contact with the inner surface of bearing journal 78. Channels 108 extend between fins 106 and are shown in phantom in FIG. 3. The cooling air flow that flows through cavity 84 is forced to flow through channels 108.

Heat sink 100 also includes standoffs 110, which are positioned to keep heat sink 100 in place in air cycle machine 10. If heat sink 100 were to slide on shaft 18 in an axially forward or aft direction, the first end or the second end of channels 108 may abut a solid surface surrounding cavity 84. This could prevent the cooling air flow from flowing through channels 108 and out of opening 86, and could choke the cooling air flow in cavity 84. Standoffs 110 prevent this from happening by preventing channels 108 on heat sink 100 from abutting a solid surface. If heat sink 100 were to move in a forward direction, standoff 110 on the first end of heat sink 100 would abut the disk or hub portion of fan blade 30. If heat sink 100 were to move in an aft direction, standoff 110 on the second end of heat sink 100 would abut a shoulder of bearing journal 78.

Heat sink 100 transfers heat out of bearing 72 and into an ambient in two ways. First, heat can be transferred through bearing journal 78 into fins 106 of heat sink 100 through contact surfaces 112. This is conductive heat transfer between two abutting surfaces. Heat that is transferred into fins 106 can then be dissipated through heat sink 100 and into shaft 18. Heat in shaft 18 can transfer through shaft 18 and can be dissipated into an ambient. Second, heat can be transferred through bearing journal 78 and into the cooling air flow that is flowing through channels 108 of heat sink 100. This is convective heat transfer, as heat is being transferred into air that is flowing across the inner surface of bearing journal 78. The cooling air flow that is flowing through channels 108 flows through opening 86 where it is discharged out of air cycle machine 10. This discharges heat from bearing 72 into an ambient through the cooling air flow.

In prior art systems, bearing 72 was cooled by flowing air through cavity 84. This cooling method was inefficient, as cooling air that was flowing through cavity 84 had a large area through which it was flowing. A majority of the cooling air flowed through the center of cavity 84 between shaft 18 and bearing journal 78. This made the cooling method inefficient, as a majority of the cooling air was not coming into contact with the inner surface of bearing journal 78.

Heat sink 100 is advantageous over prior art cooling systems, as heat can be transferred out of bearing journal 78 with both conductive and convective heat transfer. The conductive heat transfer takes place between fins 106 and the inner surface of bearing journal 78. The convective heat transfer takes place between the cooling air flowing through channels 108 and the inner surface of bearing journal 78. The convective heat transfer that happens with heat sink 100 is further advantageous over prior art convective heat transfer, as the cooling air flow is forced to flow across the inner surface of bearing journal 78 when it flows through channels 108. This increase the effectiveness and efficiency of the convective heat transfer than was previously possible, as more cooling air flow is coming into contact with the inner surface of bearing journal 78. Heat sink 100 thus improves the cooling of bearing 72 to make bearing 72 more reliable.

Heat sink 100 also provides several advantages for air cycle machine 10. First, heat sink 100 makes air cycle machine 10 more effective, as less cooling air flow is needed to cool bearing 72. This means less cooling air flow needs to be routed away from the main flow path through air cycle machine 10, thus improving the overall efficiency of air cycle machine 10. Second, as more air is kept in the main flow path through air cycle machine 10, the heat exchanger has to do less work. This means the size and weight of the heat exchanger can be reduced. The improved efficiency and effectiveness of air cycle machine 10 with heat sink 100 outweighs any concerns about the weight or cost of adding heat sink 100 to air cycle machine 10. Heat sink 100 greatly improves the thermodynamic performance of air that is flowing through air cycle machine 10.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat sink that can be positioned around a rotating shaft, the heat sink comprising:
   a cylindrical body with a first end and a second end;
   a bore running through the body with a first opening at the first end of the body and a second opening at the second end of the body;
   fins extending radially outward from the body and running from the first end to the second end of the body;
   channels defined between the fins and the body and running from the first end to the second end of the body, wherein the body forms a base of each channel that is positioned radially outward from the rotating shaft, and wherein the channels define hollow air passages that are configured to allow cooling air to flow through them;
   a first standoff including a protrusion extending axially away from the first end of the body, wherein the first standoff is positioned adjacent to one fin to allow the cooling air to flow across the first end of the body and through the channels; and
   a second standoff including a protrusion extending axially away from the second end of the body, wherein the second standoff is positioned adjacent to one fin to allow the cooling air to flow across the second end of the body and through the channels;
   wherein the body and the channels are configured to force the cooling air radially outward from the rotating shaft and into the channels so that the cooling air flows through the channels and along an inner surface of a bearing.

2. The heat sink of claim 1, wherein each of the fins comprise:
   a contact surface on a radial outer end of the fin, wherein the contact surface is positioned to come into contact with the inner surface of the bearing to cool the bearing with conductive heat transfer.

3. The heat sink of claim 1, wherein the cooling air flows along the inner surface of the bearing to cool the bearing with convective heat transfer.

4. The heat sink of claim 1, wherein the bore is sized to receive the rotating shaft.

5. A rotary machine comprising:
   a shaft extending through the rotary machine;
   a bearing positioned around the shaft; and
   a heat sink mounted on the shaft between the bearing and the shaft, wherein the heat sink has a cylindrical body with fins extending radially outward from the body and running from a first end to a second end of the body, channels between the fins and the body running from the first end to the second end of the body that are hollow air passages that are configured to allow cooling air to flow through them, a first standoff including a protrusion extending axially away from the first end of the body, and a second standoff including a protrusion extending axially away from the second end of the body;
   wherein the body forms a base of each channel that is positioned radially outward from the rotating shaft and the body of the heat sink and the channels are configured to force the cooling air radially outward from the shaft and into the channels so that the cooling air flows through the channels and along an inner surface of the bearing;

wherein the first standoff is positioned adjacent to one fin to allow the cooling air to flow across the first end of the body and through the channels; and wherein the second standoff is positioned adjacent to one fin to allow the cooling air to flow across the second end of the body and through the channels.

6. The rotary machine of claim 5, and further comprising at least one of the following:

a fan section with a fan blade mounted on the shaft;

a compressor section with a compressor nozzle mounted on the shaft; or a turbine section with a turbine nozzle mounted on the shaft.

7. The rotary machine of claim 5, wherein the bearing is a foil bearing.

8. The rotary machine of claim 5, wherein the heat sink further comprises:

a bore running through the body with a first opening at the first end of the body and a second opening at the second end of the body, wherein the shaft extends through the bore.

9. The rotary machine of claim 5, wherein each of the fins comprise:

a contact surface on a radially outer end of the fin.

10. The rotary machine of claim 9, wherein the contact surface of each of the fins is positioned against the inner surface of the bearing to conductively cool the bearing.

11. The rotary machine of claim 5, and further comprising:

a cavity around the shaft defined by a housing and the bearing through which cooling air can flow.

12. The rotary machine of claim 11, wherein the heat sink is positioned in the cavity so that cooling air that flows through the cavity will also flow through the channels along the inner surface of the bearing to convectively cool the bearing.

13. The rotary machine of claim 5, wherein the first standoff and the second standoff are positioned to limit axial movement of the heat sink on the shaft.

* * * * *